Figure 1:
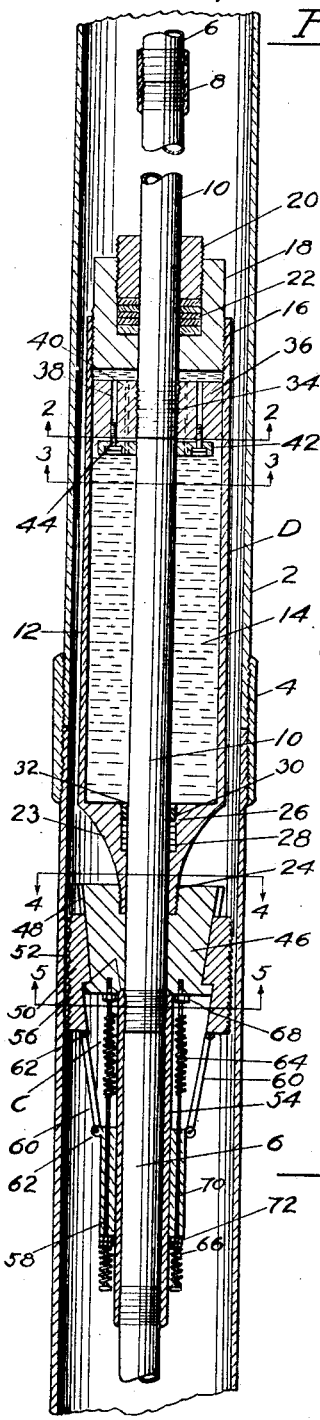

May 15, 1928.

S. CHASE 1,669,898

TUBING SHOCK ABSORBER

Filed May 11, 1926

INVENTOR.
SAMUEL CHASE
BY Fred H Hayn
ATTORNEY.

Patented May 15, 1928.

1,669,898

UNITED STATES PATENT OFFICE.

SAMUEL CHASE, OF LONG BEACH, CALIFORNIA.

TUBING SHOCK ABSORBER.

Application filed May 11, 1926. Serial No. 108,304.

My invention relates to devices or apparatus adapted for use in connection with the tubing string used in oil or other well practice, whereby costly jobs, and even the abandonment of holes may effectually be prevented, said invention relating more particularly to an improved form of tubing catcher and shock absorber for receiving and cushioning the impact of the falling tubing, when, for some reason or other, said tubing has been accidentally disconnected, said catcher and shock absorber preventing the telescoping or "cork-screwing" of said tubing, and even preventing damage to the casing, provision being made for permitting a gradual cushioning of said impact, thereby insuring that no damage whatever be done to said tubing or casing.

It accordingly is an object of my invention to provide a novel form of tubing catcher, having associated therewith a shock absorber or fluid dash pot for cushioning the impact of the falling tubing, a ported and vented plunger being associated with said dash pot, whereby the amount of fluid by-passing through said plunger may be accurately regulated, a vented valve being also associated with said plunger for this purpose.

It is also within the province of my invention to associate with the slips of the tubing catcher a novel form of adjustable equalizing means whereby said tubing catcher may be placed in fluids of varying viscosity, since if this is not provided, said catcher will not enter thick viscous fluids where these are encountered in oil well practice.

The above and further objects and advantages, as will hereinafter more fully appear, I attain by the device and apparatus constructed in accordance with the description in the specification and illustrated in the drawings and accompanying the same, and forming a part of my application.

Figure 2:
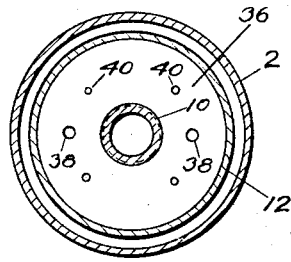
Figure 3:
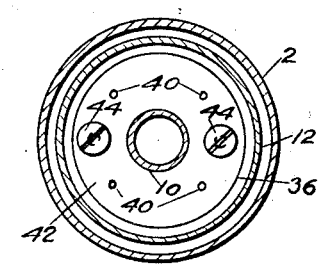
Figure 4:
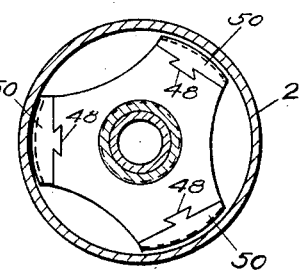
Figure 5:
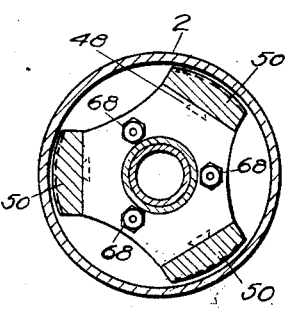
Figure 6:
Figure 7:
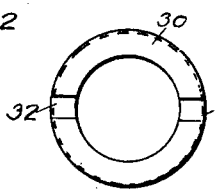

Reference is had to the accompanying drawings, in which similar reference characters denote similar parts. In the drawings, Fig. 1 is a fragmentary sectional view of a tubing casing and a string of tubing positioned therein, which tubing is equipped with my invention, Fig. 2 is an enlarged cross-sectional view of Fig. 1 on the line 2—2, Fig. 1, looking in the direction of the arrows, Fig. 3 is a similar view on the line 3—3, Fig. 1, looking in the direction of the arrows, Fig. 4 is a similar view on the line 4—4, Fig. 1, Fig. 5 is a similar view on the line 5—5, Fig. 1, Fig. 6 is a detail view of a plug adapted to be associated with one or more of the vents in the plunger, Fig. 7 is a top plan detail view, and Fig. 8 a sectional detail view of one of the packing nuts used with the hydraulic packing.

Describing my invention more in detail, the sectional tubing casing 2 is equipped with internally threaded collars 4 positioned at intervals along the length of said casing to hold said sections in detachable relation, and in said casing the string of sectional tubing 6, also secured in detachable relation by means of a set of internally threaded tubing collars 8, and associated with said tubing are the shock absorber or fluid dash pot, designated generally by the reference character D, and the tubing catcher, designated generally by the reference character C.

The tubing 6 is of the ordinary plain type, but that section thereof with which the shock absorber or dash pot D and the catcher C are associated, is polished, said section being indicated by the reference numeral 10, said section being heavy, polished and seamless.

Positioned on the section 10 is a heavy, seamless jacket or casing 12, which is adapted to house a fluid of any preferred kind, such as oil, or air indicated by the numeral 14, said jacket or casing being held on said tubing in the manner presently to be described.

It is of course necessary to pack the casing 12 carefully so that it may be rendered fluid tight. This is preferably done by means of suitable packing glands and by hydraulic packing, comprising the usual material, such as a compound of graphite, rubber, and the like. To this end the upper portion of the casing 12 is screw threaded as at 16, which threads are adapted to be engaged by a screw threaded packing nut 18, square, hexagonal, or any other preferred shape, so that it may be engaged by a wrench, a packing gland 20 being screwed thereto or otherwise detachably associated with the nut 18, and positioned below the gland 20 are layers of the hereinbefore referred to hydraulic packing 22, any desired number of such layers being provided.

Figure 8:
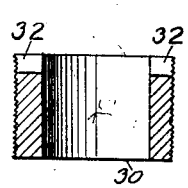

To pack the lower portion of the casing 12, the extension 23 thereof, which may be of any preferred construction, but preferably equipped with threads 24, so that the tubing catcher C, or any conventional type of such a catcher may be detachably associated therewith, is bored or otherwise hollowed out, to provide a cavity 26, to receive the hydraulic packing 28, securely held in place on the tubing section 10 by means of a packing gland nut 30, shown in detail in Figs. 7 and 8, which nut is externally threaded and equipped with notches 32, to be engaged by a sleeve wrench. Of course, any other means may be provided for holding the packing 28 in position.

Secured to the polished tubing section 10, preferably, though not necessarily, by means of threads 34, is a fluid tight plunger or piston 36, which may be provided with a suitable packing or not, as desired, so long as said plunger does not permit the fluid to by-pass externally thereof in the casing or jacket 12.

The plunger 36 is equipped with a set of comparatively large ports or passages 38, and a set of comparatively small ports, passages or vents 40, all of which permit the by-passing of the fluid through the plunger as it rises or falls with the tubing, the ports or passages 38 permitting said plunger to rise, and the vents 40 functioning to provide a cushioning effect so that said plunger shall not fall too slowly or too quickly, a set of plugs 42 (see Fig. 6) secured or otherwise positioned in said vents, being used for adjusting purposes, so this movement may in practice be accurately regulated. Of course, the number of ports 38 and vents 40 may be in practice varied as desired.

As the plunger 36 descends, it is of course necessary that the large ports 38 be closed, and any preferred form of valve 42 is used for this purpose. Said valve is associated with said plunger by means of headed bolts or screws 44, or other members, countersunk within the valve 42, so that when said plunger descends, the ports 38 may be closed. It will be understood, however, that any other preferred form of valve or means for closing off the ports 38 may be substituted therefor, and still remain within the province of my invention. Said valve is also equipped with similar ports or vents 40, as depicted more particularly in Fig. 3, to permit the fluid 14 to by-pass above the plunger 36 so that said plunger will not descend too rapidly.

My novel form of tubing catcher is indicated at C, and is equipped with an expander 46, preferably, though not necessarily screwed to the projection 23 of the casing 12, and associated with said expander, preferably by means of dove-tail joints 48, are a set of catcher slips 50, preferably though not necessarily, three in number, and symmetrically placed, said slips being equipped with the usual serrated portions 52 whereby said slips may engage the wall of the casing 2 and hold the dropped tubing in position so that it may be recovered.

The lower plain tubing section 6 is equipped with a screw threaded retaining collar 54, surrounding the polished section 10 as well as the section 6, which sections abut each other, said collar preventing the shock absorber or dash pot and tubing catcher from dropping. Said collar preferably projects into a groove 56 formed in the bottom of the expander 46, securely holding the same in position on the tubing, which groove, however, may be omitted, if desired.

Surrounding the collar 54 is a preferably cylindrical slip equalizer 58, associated with the slips 50 by means of slip arms 60 of any preferred type, to facilitate the insertion of the tubing catcher within thick fluids, and mounted on said slips and said equalizer in any manner desired, as by pivots 62.

As just stated, to permit the insertion of the tubing catcher within different wells where fluids of varying viscosity are found, the adjustable equalizing means 58 is provided. If provision is not made for such a feature, the catcher slips 50 and expander 46 could not be inserted in the fluid, said slips and expander merely floating on the surface of said fluid.

To this end the expander 46 and collar 54 are held in resilient relation by means of springs 64 and 66, any desired connection for this purpose, as the nut and bolt connection 68, being provided for this purpose, the through bolts 70 and nuts 72 being associated with the springs 66, the slips 50 being connected to the collar 54 by means of the pivoted arms 60. This construction affords an equalized movement of the parts when the device is positioned in the well, the nuts and bolts permitting a proper adjustment in relation to the different viscosity of the fluids encountered. The equalizer has no effect whatever on the action of the expander 46 when the tubing falls.

The operation of my invention should now be clear. The equalizer having been adjusted in relation to the particular viscosity of the fluid in the well, the device is positioned therein on the tubing.

When the tubing should for any reason begin to fall, then the tubing together with the dash pot would fall suddenly. The member 58, however, because of the inertia, would tend to hold its position or else not fall as rapidly as the rest of the unit. There would thus be brought about a relative movement between the expander member 46 and the catcher jaws 50, which movement would cause the jaws to expand outwardly against the casing wall and stop further falling of the tubing. Upon this happening, the dash pot unit would be retained against further rapid downward movement and the tubing 10 with its attached piston would begin to move gradually downward in the dash pot, the vents permitting the transfer of liquid from below to above the piston. Such gradual movement would tend to relieve the tubing from undue strains and also effect the final gradual gripping of the casing by the jaws thus minimizing shocks to the tubing and casing.

It will of course be obvious that my invention may be modified throughout a wide range. I accordingly do not propose to be limited to the exact details of construction shown and described, but reserve the right in practice to make any and all modifications thereof that fall within the scope of the appended claims.

I claim as my invention:

1. A shock absorber for a tubing catcher comprising a fluid tight casing adapted to house a fluid, a string of tubing extending through said casing, a plunger secured to said tubing, said plunger being equipped with sets of through passages therein to permit by-passing of said fluid, and a ported valve associated with said piston adapted to control certain of said passages and also to permit the fluid to pass through said valve.

2. A shock absorber for a tubing catcher comprising a casing adapted to house a fluid, a string of tubing extending through said casing, means associated with said casing and said tubing for rendering said casing fluid tight, a plunger secured to said tubing and adapted to travel therewith, said plunger being equipped with two sets of through ports of different sizes, and means associated with said plunger for controlling one set of said ports.

3. A shock absorber for a tubing catcher, in combination with a string of tubing, a fluid dash pot associated with said tubing, said dash pot comprising a ported plunger secured to said tubing, and a ported valve adapted, when said plunger descends with said tubing, to close certain of the ports of said plunger, while certain other of said ports, and the ports in said valve permit said fluid to by-pass above said plunger.

4. In a tubing catcher, in combination with the tubing of a well, an expander, a set of catcher slips external of said expander adapted to receive said expander therebetween, a slip equalizer associated with said slips, means for holding said expander and said equalizer in resilient relation, and a shock absorber dash pot for cushioning the impact of said tubing.

5. In a tubing catcher, in combination, a string of tubing, a tubing catcher associated with said tubing, said catcher comprising an expander, a plurality of slips adapted to receive said expander, dove-tail means associated with said expander and said slips, a collar on said tubing positioned below said weight, a slip equalizer on said tubing, and positioned below said collar, a set of slip arms associated with said slips and said equalizer, and a fluid dash pot on said tubing and connected to said expander to cushion the impact of said tubing.

6. In a device of the class described, in combination, a string of tubing, a tubing catcher on said tubing, and a fluid dash pot surrounding said tubing and forming a fluid tight joint therewith, said dash pot being connected to said tubing catcher to cushion the impact of said tubing, substantially as described.

7. In a device of the class described, in combination, a string of tubing, a tubing catcher on said tubing, said catcher comprising an expander, a set of dove-tailed slips associated with said expander, a slip equalizer connected to said slips, resilient means connecting said expander and said equalizer, means for adjusting said resilient means, and a shock absorber on said tubing connected to said expander to cushion the impact of said tubing.

8. In a device of the class described, in combination, a string of tubing, a fluid pressure dash pot surrounding said tubing and forming a fluid tight joint therewith, and a tubing catcher associated with said dash pot and said tubing and connected to said catcher, said dash pot functioning to prevent said tubing from telescoping or cork-screwing, substantially as described.

9. In a device of the class described, in combination, a string of tubing, a tubing catcher associated with said tubing, a fluid dash pot surrounding said tubing and connected to said catcher, and sets of packing means for rendering said dash pot fluid tight relative to said tubing, substantially as described.

10. In a fluid dash pot for cushioning the impact of a tubing catcher, a string of tubing, a casing adapted to house a fluid surrounding said tubing, means associated with said casing and said tubing for rendering said casing fluid tight, a plunger on said tubing and adapted to be reciprocated in said casing, said plunger being equipped with a set of passages for permitting said fluid to pass above said plunger, a valve for controlling said passages, said plunger and said valve being also equipped with a set of vents, and means for closing off certain of said vents whereby the amount of fluid passing through said vents and above said plunger may be regulated.

In testimony whereof I have signed my name to this specification.

SAMUEL CHASE.